(12) United States Patent
Kishida et al.

(10) Patent No.: US 11,695,832 B2
(45) Date of Patent: *Jul. 4, 2023

(54) DATA SEARCH APPARATUS, AND DATA SEARCH METHOD AND PROGRAM THEREOF, AND EDGE SERVER AND PROGRAM THEREOF

(71) Applicant: NTT Communications Corporation, Tokyo (JP)

(72) Inventors: Tsunechika Kishida, Yokohama (JP); Hideaki Akabori, Yokohama (JP); Tatsuo Fujita, Yokohama (JP)

(73) Assignee: NTT Communications Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/299,235

(22) PCT Filed: Dec. 6, 2019

(86) PCT No.: PCT/JP2019/047818
§ 371 (c)(1),
(2) Date: Jun. 2, 2021

(87) PCT Pub. No.: WO2020/116611
PCT Pub. Date: Jun. 11, 2020

(65) Prior Publication Data
US 2022/0038535 A1    Feb. 3, 2022

(30) Foreign Application Priority Data
Dec. 6, 2018 (JP) .................................. 2018-228987

(51) Int. Cl.
*H04L 29/08*    (2006.01)
*H04L 67/1097*    (2022.01)
(Continued)

(52) U.S. Cl.
CPC ........ *H04L 67/1097* (2013.01); *G06F 16/953* (2019.01); *H04L 67/568* (2022.05)

(58) Field of Classification Search
CPC ............. H04L 67/1097; H04L 67/2842; H06F 16/953
See application file for complete search history.

(56) References Cited

U.S. PATENT DOCUMENTS 6,874,017 B1    3/2005 Inoue et al.
7,490,073 B1    2/2009 Qureshi et al.
(Continued)

FOREIGN PATENT DOCUMENTS

JP    2000-276425 A    10/2000
JP    2003-085032 A    3/2003
(Continued)

OTHER PUBLICATIONS

English Translation of International Preliminary Report on Patentability for PCT Application No. PCT/JP2019/047818, dated Jun. 8, 2021, in 8 pages.
(Continued)

*Primary Examiner* — Shean Tokuta
(74) *Attorney, Agent, or Firm* — Knobbe, Martens, Olson & Bear, LLP

(57) ABSTRACT

A system using edge computing is enabled to efficiently acquire data of an acquisition target without fail. A data search server KSV includes an industry information table 221 which stores an edge ID of an edge server operated and managed by a company/body, the edge ID being correlated with an industry ID which identifies an industry, and an ID of the company/body belonging to the industry. When a data acquisition request designating the industry ID is received from a user terminal, edge servers correlated with the designated industry ID are searched from the industry infor-
(Continued)

mation table 221, and sensing data is acquired from the searched edge servers and transmitted to the user terminal of the source of the request.

7 Claims, 6 Drawing Sheets

(51) Int. Cl.
  *G06F 16/953* (2019.01)
  *H04L 67/568* (2022.01)

(56) References Cited

U.S. PATENT DOCUMENTS

| | | | |
|---|---|---|---|
| 7,809,909 B2 | 10/2010 | Iwamura et al. | |
| 8,566,549 B1 | 10/2013 | Burke et al. | |
| 9,167,036 B2 | 10/2015 | Seed et al. | |
| 9,614,852 B2 | 4/2017 | Kiriyama et al. | |
| 9,898,539 B2* | 2/2018 | Kawamura | G06F 16/9537 |
| 9,910,470 B2 | 3/2018 | Garg et al. | |
| 10,678,941 B2 | 6/2020 | Ohsaki et al. | |
| 10,922,325 B2* | 2/2021 | Yamato | G06F 16/24578 |
| 11,102,123 B2 | 8/2021 | Ohuchi | |
| 11,443,390 B1 | 9/2022 | Caligaris et al. | |
| 2002/0052915 A1 | 5/2002 | Amin-Salehi | |
| 2002/0069420 A1 | 6/2002 | Russell et al. | |
| 2003/0115421 A1 | 6/2003 | McHenry et al. | |
| 2005/0114730 A1 | 5/2005 | Iwamura et al. | |
| 2007/0078943 A1 | 4/2007 | Daniels et al. | |
| 2007/0157288 A1 | 7/2007 | Lim | |
| 2007/0169168 A1 | 7/2007 | Lim | |
| 2008/0060051 A1 | 3/2008 | Lim | |
| 2010/0070448 A1 | 3/2010 | Omoigui | |
| 2012/0069131 A1 | 3/2012 | Abelow | |
| 2012/0317366 A1 | 12/2012 | Sato et al. | |
| 2013/0204997 A1 | 8/2013 | Eggleston et al. | |
| 2014/0277788 A1 | 9/2014 | Forbes, Jr. | |
| 2015/0271295 A1 | 9/2015 | Mahoney et al. | |
| 2016/0112263 A1 | 4/2016 | Henry et al. | |
| 2016/0204990 A1 | 7/2016 | Shattil | |
| 2016/0287189 A1 | 10/2016 | Modai et al. | |
| 2017/0053032 A1 | 2/2017 | Liongosari et al. | |
| 2017/0134239 A1 | 5/2017 | Mahoney et al. | |
| 2017/0353367 A1 | 12/2017 | Slaight et al. | |
| 2017/0366513 A1* | 12/2017 | Kumaran | H04L 63/0421 |
| 2018/0026913 A1 | 1/2018 | Balle et al. | |
| 2018/0150489 A1 | 5/2018 | Yamazaki | |
| 2018/0167434 A1 | 6/2018 | Sathyanarayana et al. | |
| 2018/0284758 A1 | 10/2018 | Cella et al. | |
| 2018/0293587 A1* | 10/2018 | Oda | G06Q 30/06 |
| 2019/0036830 A1 | 1/2019 | Yamato | |
| 2019/0041835 A1 | 2/2019 | Cella et al. | |
| 2019/0044812 A1 | 2/2019 | Loftus et al. | |
| 2019/0080197 A1 | 3/2019 | Kato | |
| 2019/0208006 A1 | 7/2019 | Chen et al. | |
| 2019/0281078 A1 | 9/2019 | Eguiarte Salazar et al. | |
| 2019/0281132 A1* | 9/2019 | Sethuraman | H04L 67/303 |
| 2022/0043867 A1 | 2/2022 | Kishida et al. | |
| 2022/0075563 A1 | 3/2022 | Kishida et al. | |

FOREIGN PATENT DOCUMENTS

| | | | | |
|---|---|---|---|---|
| JP | 2005-534087 A | | 11/2005 | |
| JP | 2007-41660 A | | 2/2007 | |
| JP | 2015-176350 A | | 10/2015 | |
| JP | 2016-085522 A | | 5/2016 | |
| JP | 2016-139354 A | | 8/2016 | |
| JP | 2017-84134 A | | 5/2017 | |
| JP | 2017-167748 A | | 9/2017 | |
| JP | 2018-81377 A | | 5/2018 | |
| JP | 2020009170 A | * | 1/2020 | |
| WO | WO2012/0164671 A1 | | 12/2012 | |
| WO | WO2013/153890 A | | 10/2013 | |
| WO | WO2014/045699 A1 | | 3/2014 | |
| WO | WO-2018180369 A1 | * | 10/2018 | G08C 15/00 |
| WO | WO 2020/116612 A1 | | 6/2020 | |
| WO | WO-2020116610 A1 | * | 6/2020 | G06F 16/2471 |
| WO | WO-2020116611 A1 | * | 6/2020 | G06F 16/2471 |
| WO | WO-2021035084 A1 | * | 2/2021 | G06F 16/27 |

OTHER PUBLICATIONS

International Search Report for PCT Application No. PCT/JP2019/047817, dated Mar. 10, 2020 in 5 pages.
International Search Report for PCT Application No. PCT/JP2019/047818, dated Mar. 10, 2020 in 5 pages.
International Search Report for PCT Application No. PCT/JP2019/047819, dated Feb. 18, 2020 in 5 pages.
U.S. Appl. No. 17/299,240 (Pub. No. 2022/0043867), filed Jun. 2, 2021, Data Search Apparatus, And Data Search Method And Progam Thereof, And Edge Server And Program Thereof.
U.S. Appl. No. 17/299,185 (Pub. No. 2022/0075563), filed Jun. 2, 2021, Storage Management Apparatus, Method And Program.
Extended European Search Report for EP Application No. 19893078.6, dated Jan. 4, 2022, 9 pages.
Extended European Search Report for EP Application No. 19893830.0, dated Jan. 4, 2022, 10 pages.
Extended European Search Report for EP Application No. 19893316.0, dated Dec. 10, 2021, 7 pages.
International Search Report and Written Opinion for PCT Application No. PCT/JP2019/047817, dated Mar. 10, 2020, in 13 pages.
International Preliminary Report on Patentability for Application No. PCT/JP2019/047817, dated Jun. 17, 2021, in 11 pages.
International Search Report and Written Opinion for PCT Application No. PCT/JP2019/047818, dated Mar. 10, 2020, in 15 pages.
International Preliminary Report on Patentability for PCT Application No. PCT/JP2019/047818, dated Jun. 17, 2021, in 13 pages.
International Search Report and Written Opinion for PCT Application No. PCT/JP2019/047819, dated Feb. 18, 2020, in 13 pages.
International Preliminary Report on Patentability for PCT Application No. PCT/JP2019/047819, dated Jun. 17, 2021, in 11 pages.
Japanese Office Action for JP Application No. 2018-229020, dated Jun. 7, 2022, 8 pages.
Japanese Office Action for JP Application No. 2018-228987, dated Jun. 7, 2022, 7 pages.

* cited by examiner

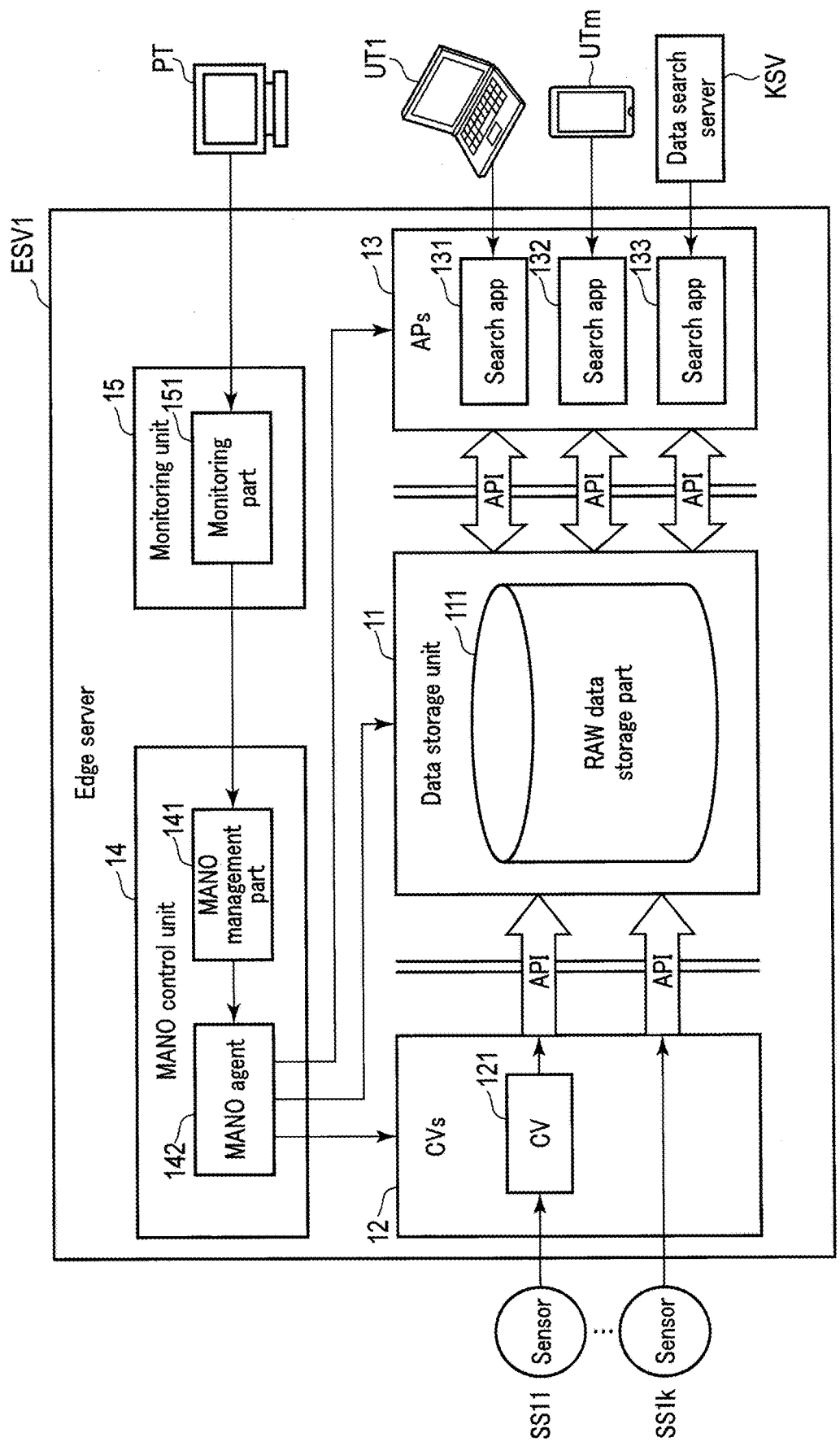
F I G. 2

⟨Industry information table⟩

| Industry ID | Company/body ID | Edge ID |
|---|---|---|
| A | a1, a2, a3 | Ea11, Ea12<br>Ea21<br>Ea31, Ea32 |
| B | b1, b2 | Eb11, Eb21<br>Eb22 |
| C | c1, c2, c3, c4 | Ec11, Ec12<br>Ec21, Ec22<br>Ec31<br>Ec41 |
| ⋮ | ⋮ | ⋮ |

FIG. 4

⟨Industry relation information table⟩

| Industry ID | Related industry ID |
|---|---|
| A | C, D |
| B | C |
| C | A, B, E |
| D | A |
| ⋮ | ⋮ |

FIG. 5

DATA SEARCH APPARATUS, AND DATA SEARCH METHOD AND PROGRAM THEREOF, AND EDGE SERVER AND PROGRAM THEREOF

This is a U.S. national phase application under 35 USC 371 of International Application No. PCT/JP2019/047818 (not published in English), filed Dec. 6, 2019.

FIELD

One mode of the present invention relates to a data search apparatus, and a data search method and a program thereof, and an edge server and a program thereof, which are used in a data circulation system utilizing edge computing.

BACKGROUND

In recent years, attention has been paid to a data circulation system using IoT (Internet of Things) technology, in which, for example, devices including various sensors are connected to a network and sensing data is collected from these devices and utilized.

In the data circulation system using the IoT technology, it is indispensable to utilize various IoT data in combination, in order to further enhance the value creation, and there is an increasing demand for the realization of "IoT data exchange society" which circulates and utilize the IoT data across services. In order to meet the demand, IoT data exchange technology, which exactly and scalably transmits IoT data from various kinds of devices to various applications, is important.

Under the circumstances, edge computing has been proposed. In the edge computing, a plurality of edge servers are distributedly arranged at peripheral parts of a carrier network. The edge server includes an arithmetic processing function and a storage function, and executes an application program and stores content data. A user, who intends to utilize IoT data, accesses each edge server from his/her own terminal, searches data, and acquires desired IoT data (see, e.g. NPL 1).

CITATION LIST

Non Patent Literature

NPL 1: Atsushi TERAUCHI, Kenichi OHTO, Noriuchi TAKAHASHI, Kei HARADA, Ikuo YAMAZAKI, "Grappling with data exchange technology which provides real-time scalability of computation processing", [online], NTT Technical Journal, July 2017, pp. 19-23, Internet <URL: http://www.ntt.co.jp/journal/1707/files/JN20170719.pdf>

SUMMARY

Technical Problem

With a system using edge computing, data can be acquired with a less propagation delay than in the case where IoT data is all acquired from a cloud. However, if the number of edge computers that are disposed increases in accordance with an expansion of the system, the user has to individually access many edge computers in order to acquire data of a field that is an analysis target, and a great deal of time and labor is needed to acquire desired data. Moreover, since a failure to acquire data tends to easily occur, a deterioration in analysis precision of data, or the like, is unavoidable.

The present invention has been made by paying attention to the above circumstances, and the object of the invention is to provide a technology which can efficiently acquire, without fail, data of an acquisition target in a system using edge computing.

Solution to Problem

In order to achieve the above object, according to a first mode of a data search apparatus relating to the present invention, there is provided a data search apparatus communicable via a network with a plurality of data accumulation apparatuses functioning as a data provision side and with a terminal functioning as a data acquisition side, the data search apparatus including: a storage medium configured to correlate and store, when the data accumulation apparatuses functioning as the data provision side belong to a plurality of groups in a distributed fashion, information which identifies the data accumulation apparatuses, and identification information of a group to which the data accumulation apparatuses belong; a data collection part configured to search, when receiving a data acquisition request including identification information of the group from the terminal functioning as the data acquisition side, a data accumulation apparatus from the storage medium, which belongs to a group corresponding to the identification information of the group included in the data acquisition request, and to collect accumulated data from the searched data accumulation apparatus; and a data transmission part configured to transmit the collected data to the terminal of a source of the acquisition request.

According to a second mode of the data search apparatus relating to the present invention, there is provided a data search apparatus communicable via a network with a plurality of edge servers functioning as a data provision side and with a terminal functioning as a data acquisition side, the edge servers being configured to receive and accumulate data transmitted from a plurality of devices, the data search apparatus including: a first storage table configured to correlate and store information which identifies the edge servers, and information which identifies an organization to which an owner of the devices which transmit the data to the edge servers belongs; an edge server search part configured to search, when receiving a data acquisition request including the identification information of the organization from the terminal functioning as the data acquisition side, identification information of an edge server, which is correlated with the identification information of the organization included in the data acquisition request, from the first storage table; a first data collection part configured to collect, based on the searched identification information of the edge server, the accumulated data from the corresponding edge server; and a first data transmission part configured to transmit via the network the collected data to the terminal which is a transmission source of the data acquisition request.

According to a third mode of the data search apparatus relating to the present invention, the data search apparatus further includes: an edge attribute information acquisition part configured to acquire edge attribute information including the identification information of the edge server and the identification information of the organization to which the owner of the devices which transmit the data to the edge servers belongs; and a storage table management part configured to generate or update the first storage table, based on each identification information included in the acquired edge attribute information.

According to a fourth mode of the data search apparatus relating to the present invention, the data search apparatus further includes: a second storage table configured to represent a relation between the organizations; a related organization search part configured to search, based on the identification information of the organization included in the data acquisition request received from the terminal functioning as the data acquisition side, another organization having a relation with the organization from the second storage table; and a list transmission part configured to search, from the first storage table, identification information of an edge server correlated with the searched another organization, and to transmit, via the network, list information representative of a list of the edge server to the terminal which is the transmission source of the data acquisition request.

According to a fifth mode of the data search apparatus relating to the present invention, the data search apparatus further includes: a second data collection part configured to collect, when receiving from the terminal a data additional acquisition request including identification information of an edge server included in the list information, the accumulated data from the corresponding edge server, based on the identification information of the edge server included in the data additional acquisition request; and a second data transmission part configured to transmit via the network the collected data to the terminal which is a transmission source of the data additional acquisition request.

According to a sixth mode of the data search apparatus relating to the present invention, when a local edge network, which interconnects the edge servers, is provided separately from the network, the first or second data collection part collects the accumulated data from the edge servers via the edge network.

According to a first mode of an edge server relating to the present invention, there is provided an edge server communicable with a data search apparatus via the network, including: a data reception accumulation part configured to receive and accumulate data transmitted from a plurality of devices; an edge attribute information storage part configured to store edge attribute information including information which identifies the edge server, and identification information of an organization to which an owner of the devices which transmit the data to the edge server belongs; an edge attribute information transmission part configured to transmit the edge attribute information to the data search apparatus via the network; and a data transmission part configured to transmit, in response to a request from the data search apparatus, the data accumulated in the data reception accumulation part to the data search apparatus via the network.

According to a second mode of the edge server relating to the present invention, there is provided an edge server which is a specific edge server of a plurality of edge servers capable of receiving and accumulating data transmitted from a plurality of devices and capable of executing data transmission among the edge servers, the edge server including: a storage table configured to correlate and store information which identifies the edge servers, and information which identifies an organization to which an owner of the devices which transmit the data to the edge servers belongs; a request reception part configured to receive via a network a data acquisition request including the identification information of the organization, the data acquisition request being transmitted from a terminal functioning as a data acquisition side; an edge server search part configured to search, from the storage table, identification information of an edge server which is correlated with the identification information of the organization included in the received data acquisition request; a data collection part configured to collect, based on the searched identification information of the edge server, the accumulated data from the corresponding edge server; and a data transmission part configured to transmit via the network the collected data to the terminal which is a transmission source of the data acquisition request.

Advantageous Effects

According to the first mode of the data search apparatus relating to the present invention, the storage medium is provided which correlate the identification information of the data accumulation apparatuses functioning as the data provision side, and the identification information of the group to which the data accumulation apparatuses belong. Thereby, in the data search apparatus, when the data acquisition request is received from the terminal on the data acquisition side, the data accumulation apparatus belonging to the group designated by the data acquisition request is searched from the storage medium, and the accumulated data is collected from the searched data accumulation apparatus, and transmitted to the terminal of the source of the request. Thus, for example, by simply designating in the data acquisition request the group with respect to which the user wishes to collect data, the user on the data acquisition side can acquire batchwise the accumulated data of each data accumulation apparatus belonging to the group. Accordingly, the user does not need to perform an operation of acquiring data by individually accessing all data accumulation apparatuses which are data acquisition destinations. Thereby, the user can efficiently acquire the data of the acquisition target without fail.

According to the second mode of the data search apparatus relating to the present invention, the first storage table is provided which correlate the identification information of the edge servers, and the identification information of the organization to which the owner of the devices which transmit the data to the edge servers belong. Thereby, in the data search apparatus, when the data acquisition request including the identification information of the organization is received from the terminal on the data acquisition side, the edge server belonging to the organization designated by the data acquisition request is searched from the first storage table, and the accumulated data is collected from the searched edge server, and transmitted to the terminal of the source of the request. Thus, for example, by simply designating in the data acquisition request the organization, for instance, the industry name or the company/body name, with respect to which the user wishes to collect data, the user on the data acquisition side can acquire batchwise the accumulated data of all edge servers belonging to the designated industry or company/body. Accordingly, the user does not need to perform an operation of acquiring data by individually accessing all edge servers which are data acquisition destinations. Thereby, the user can efficiently acquire the data of the acquisition target without fail.

According to the third mode of the data search apparatus relating to the present invention, the edge attribute information including the identification information of the edge server and the identification information of the organization, to which the owner of the devices which transmit the data to the edge servers belongs, is acquired from, for example, the edge server, cloud server or the like. The first storage table is generated or updated, based on the acquired edge attribute information. Thus, without the system administrator or the like performing an operation of manually generating or updating the table, the first storage table can be automatically generated or updated.

According to the fourth mode of the data search apparatus relating to the present invention, the second storage table configured to represent the relation between the organizations is prepared. Thereby, based on the identification information of the organization designated from the data acquisition side, another organization having a relation with the organization is searched from the second storage table. Further, from the first storage table, the identification information of the edge server correlated with the searched another organization is searched, and the list information of the searched edge servers is transmitted to the terminal on the data acquisition side. Thus, the user on the data acquisition side can acquire not only the accumulated data of the edge servers correlated with, for example, the organization, such as the industry or the company/body, designated by the user himself/herself, but also the list of edge servers correlated with some other related organization.

According to the fifth mode of the data search apparatus relating to the present invention, when the user on the data acquisition side transmits the data additional acquisition request designating a desired edge server from the list information, the data accumulated in the corresponding edge server is collected and transferred to the user on the data acquisition side. Thus, by simply designating the desired edge server from the list of edge servers belonging to some other related industry, or to the company/body, the user can also acquire the data of the edge server relating to the related industry or the company/body.

According to the sixth mode of the data search apparatus relating to the present invention, when the edge servers are communicable via the edge network constructed by, for example, a local area network or the like, the data search apparatus can collect data from the edge servers via the edge network, not through the wide area network. As a result, the collection of data from the edge server can be carried out without undergoing the influence of the transmission band or traffic of the wide area network.

According to the first mode of the edge server relating to the present invention, the edge attribute information including the identification information of the edge server and the identification information of the organization to which the owner of the devices which transmit the data to the edge server belongs, is transmitted to the data search apparatus. Specifically, without the administrator or the like of the data search apparatus performing an operation of manually generating or updating the storage table, the storage table can be automatically generated or updated.

According to the second mode of the edge server relating to the present invention, in the edge server, when the data acquisition request including the identification information of the organization is received from the terminal on the data acquisition side, the edge server belonging to the organization designated by the data acquisition request is searched from the storage table, and the accumulated data is acquired from the searched edge server, and transmitted to the terminal of the source of the request. Thus, for example, by simply transmitting to the specific edge server the data acquisition request designating the organization, for instance, the industry name or the company/body name, with respect to which the user wishes to collect data, the user on the data acquisition side can acquire batchwise the accumulated data of all edge servers belonging to the designated industry or company/body. Accordingly, the user does not need to perform an operation of acquiring data by individually accessing all edge servers which are data acquisition destinations. Thereby, the user can efficiently acquire the data of the acquisition target without fail.

Specifically, according to each mode of the present invention, it is possible to provide a technology which enables efficient acquisition, without fail, of data of an acquisition target in a system using edge computing.

BRIEF DESCRIPTION OF THE DRAWINGS

FIG. 2 is a block diagram illustrating a configuration of an edge server of the data circulation system illustrated in FIG. 1.

FIG. 4 is a view illustrating an example of an industry information table which the data search apparatus illustrated in FIG. 3 manages.

FIG. 5 is a view illustrating an example of an industry relation information table which the data search apparatus illustrated in FIG. 3 manages.

DETAILED DESCRIPTION

Hereinafter, embodiments relating to the present invention will be described with reference to the accompanying drawings.

Figure 1:
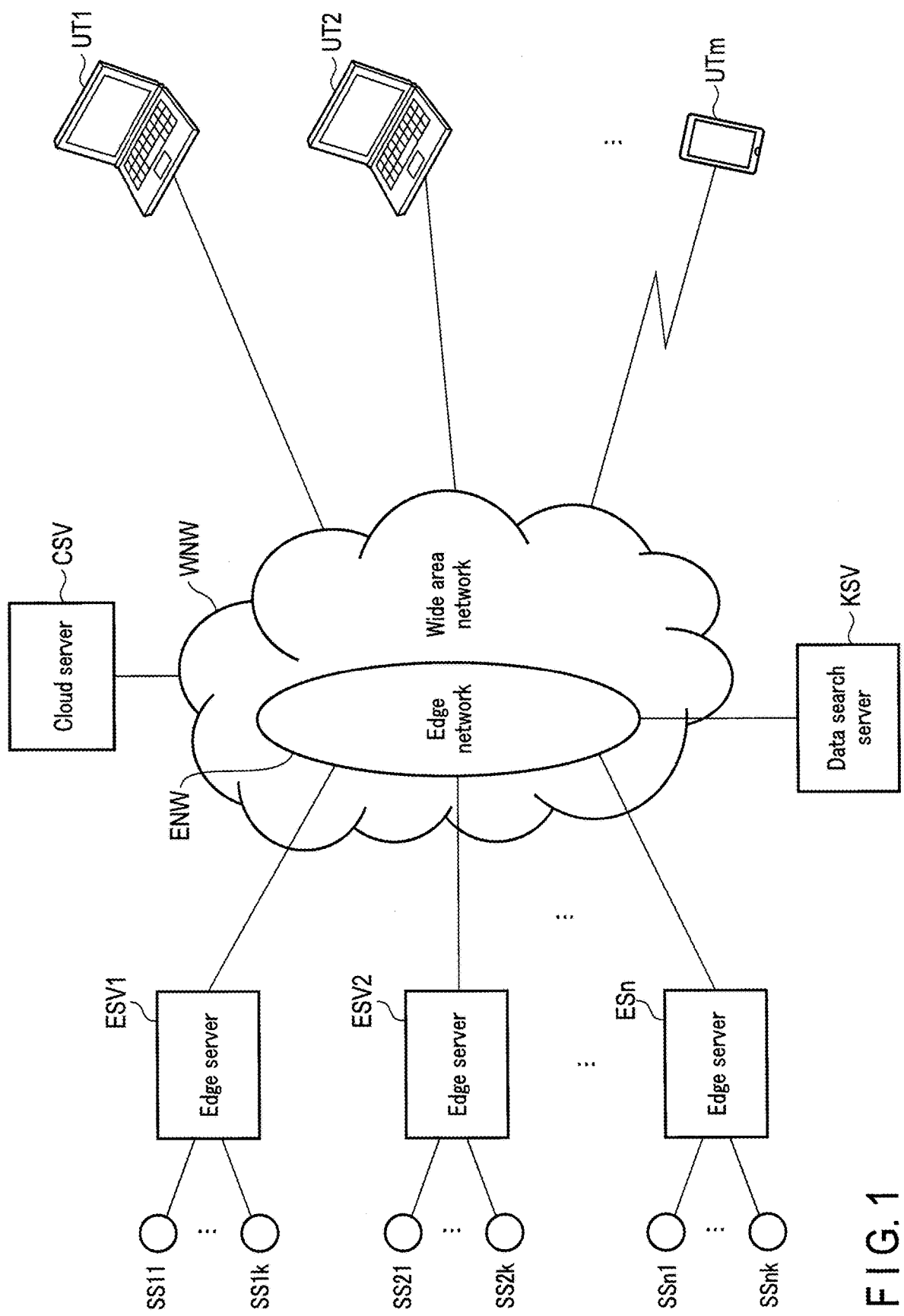
FIG. 1 is a diagram illustrating an entire configuration of a data circulation system including a data search apparatus according to one embodiment of the present invention.

One Embodiment (Configuration)
(1) System
FIG. 1 is a diagram illustrating an entire configuration of a data circulation system including a data search apparatus according to one embodiment of the present invention.

The data circulation system is configured such that edge servers ES1 to ESn functioning as data provision-side apparatuses, user terminals UT1 to UTm functioning as data acquisition-side apparatuses, and a cloud server CSV are connected via a wide area network WNW, and, furthermore, a data search server KSV functioning as a data search apparatus is provided.

The wide area network WNW includes, for example, a public network such as the Internet, and an access network for accessing the public network. The access network includes an edge network ENW which connects the edge servers ES1 to ESn. The edge network ENW is constructed by, for example, a LAN (Local Area Network) or a wireless LAN. Note that the edge servers ES1 to ESn may be configured to be connected to the Internet without intervention of the edge network ENW.

The edge servers ESV1 to ESVn are composed of, for example, server computers or gateways, and are disposed in respective monitoring targets which are, mainly, factories and business facilities managed by companies or bodies; hospitals; office buildings; commercial establishments; event/amusement facilities; animal and plant farming facilities; infrastructure facilities such as houses, roads, bridges, steel towers, and space facilities; and natural environments such as volcanos, coasts, islands, mountains and fields. Note that the edge servers ESV1 to ESVn may be provided not only in the above-mentioned stationary infrastructure facilities, but may be provided in association with areas of movement of moving bodies such as vehicles, airplanes, drones and ships. In addition, the edge servers ESV1 to ESVn may be disposed in existing communication facilities, such as base stations of mobile communication systems, low-power-type small-sized base stations, integration stations, access points of wireless LAN or the like, and DSL (Digital Subscriber Line) boxes.

The edge servers ESV1 to ESVn are connected to a plurality of sensors SS11 to SS1$k$, SS21 to SS2$k$, . . . , SSn1 to SSnk, respectively. The sensors SS11 to SS1$k$, SS21 to SS2$k$, . . . , SSn1 to SSnk include, for example, equipment sensors which measure vibrations, strains and temperatures of equipment; environment sensors which measure temperatures, humidity, atmospheric pressure, wind velocity, dust concentration, and chemical substance concentration; monitoring sensors which detect positions, movements, numbers and the like of humans and animals by using cameras or the like; and biological sensors which measure body temperatures, blood pressure, pulsations, and the like of humans.

Sensing data measured or detected by the sensors SS11 to SS1$k$, SS21 to SS2$k$, . . . , SSn1 to SSnk is transmitted to the edge servers ESV1 to ESVn which are preset as transmission destinations, via wireless interfaces which adopt low-power wireless data communication standards such as LAN, wireless LAN, Bluetooth (trademark) and the like. Note that the sensing data transmitted from the sensors SS11 to SS1$k$, SS21 to SS2$k$, . . . , SSn1 to SSnk may be transmitted to the edge servers ESV1 to ESVn via access points, mobile terminals such as smartphones, or the like.

The cloud server CSV is composed of a cloud computer, and receives sensor data, which is transmitted from the edge servers ESV1 to ESVn, via the wide area network WNW, and accumulates the sensor data. In addition, when receiving a data acquisition request from the user terminal, UT1 to UTm, the cloud server CSV transmits the sensing data, which is indicated by the data acquisition request, to the user terminal, UT1 to UTm, which is the source of the request.

The user terminals UT1 to UTm are used by, for example, service business operators or the like that acquire and analyze sensing data, and are composed of a personal computer, a smartphone, a tablet terminal, and the like. The user terminal, UT1 to UTm, includes, for example, a browser for the acquisition process of the sensing data.

(2) Edge Server

Figure 3:
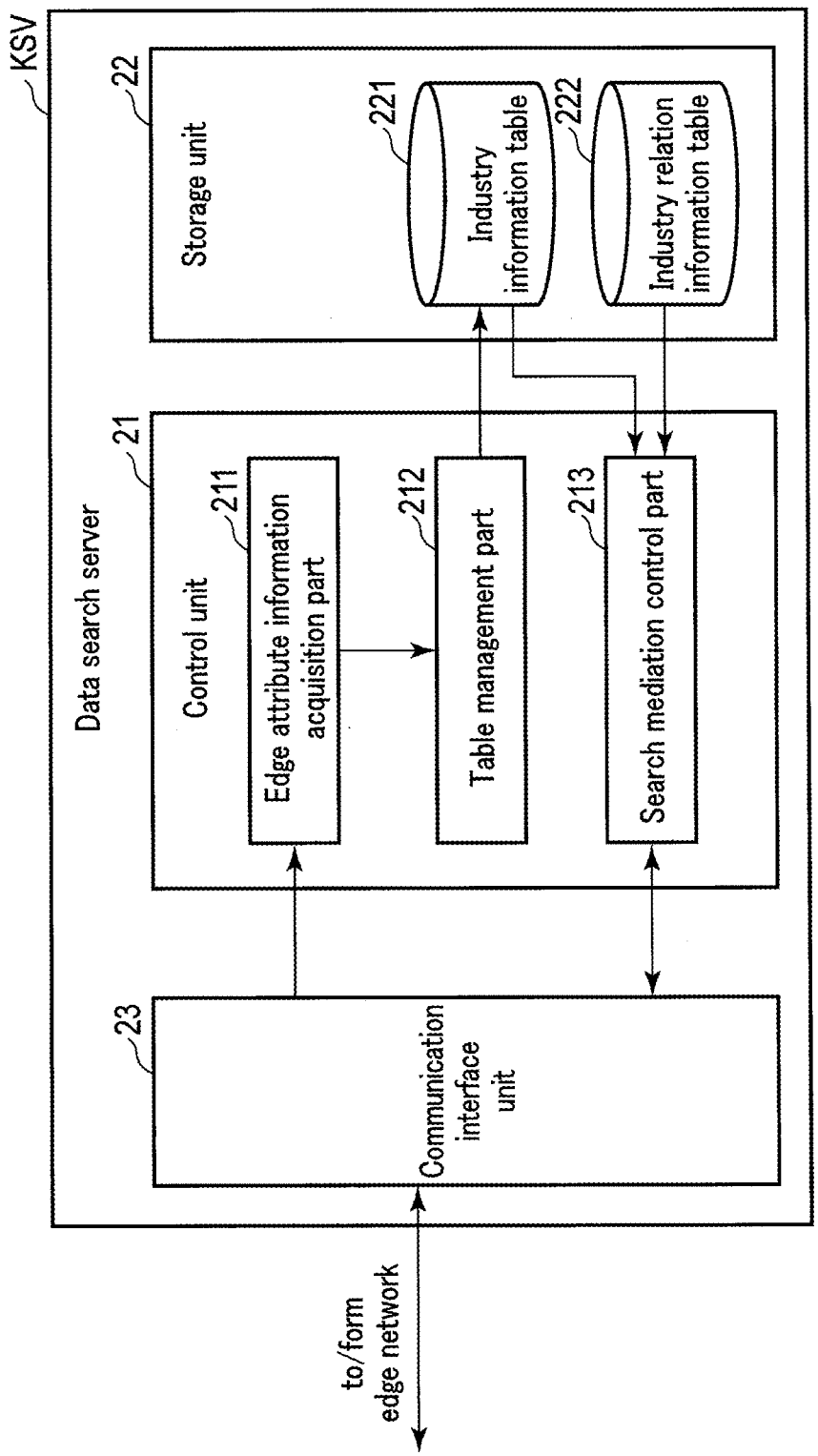
FIG. 3 is a block diagram illustrating a functional configuration of the data search apparatus used in the data circulation system illustrated in FIG. 1.

FIG. 2 is a block diagram illustrating an example of the configuration of the edge server, ESV1 to ESVn. Note that FIG. 3 representatively illustrates only the edge server ESV1, for the purpose of simpler illustration.

The edge server, ESV1 to ESVn, includes a data storage unit 11, converters (CVs) 12, applications (APs) 13, a control unit 14, and a monitoring unit 15.

The data storage unit 11 is composed as a storage medium by, for example, a nonvolatile memory capable of random write and read, such as an HDD (Hard Disk Drive) or an SSD (Solid State Drive). A RAW data storage part 111 is provided in the storage area, and the sensing data transmitted from the sensors SS11 to SS1$k$ is stored in the RAW data storage part 111.

The CVs 12 include a plurality of converters (CVs) 121. The converters 121 are provided in association with those of the sensors SS11 to SS1$k$, which require protocol conversion processing. The converters 121 convert the sensing data, which is received from the sensors SS11 to SS1$k$, to, for example, protocols suited to data circulation. The sensing data converted by the converters 121 is stored in the RAW data storage part 111 by APIs (Application. Programming Interfaces). Note that a time stamp representative of a measurement date/time, and identification information (sensor IDs) of the sensors are imparted to the sensing data.

The APs 13 include a plurality of application programs for search (hereinafter referred to as "search apps") 131 to 133. Responding to data acquisition requests from the user terminals UT1 and UTm and a data search server KSV (to be described later), the search apps 131 to 133 execute processes of reading the corresponding sensing data from the RAW data storage part 111 and transmitting the sensing data to the sources of the requests. At this time, identification information (hereinafter referred to as "edge ID") of the edge server ESV1 is imparted to the transmission data. Note that a data transfer process between the search apps 131 to 133 and the RAW data storage part 111 is also executed by the APIs.

The monitoring unit 15 is composed of monitoring middleware, and includes a monitoring part 151 functioning as a monitoring tool. The monitoring part 151 provides display screen data for operation management to an operation management terminal PT, receives instruction information for operation management, which is input in the operation management terminal PT, and supplies the instruction information to the control unit 14.

The control unit 14 includes a MANO (Management and Orchestration) management part 141 and a MANO agent 142. The MANO management part 141 and the MANO agent 142 are configured to execute an integral management/control/optimization process of network services and resources in the edge server ESV1, and manage respective software containers (programs) that are management targets in the edge server ESV1, based on the instruction information for operation management, which is supplied from the monitoring part 151.

(3) Data Search Server

FIG. 3 is a block diagram illustrating a functional configuration of the data search server KSV. The data search server KSV is operated by, for example, a network business operator, communication business operator or service operator that operates data circulation services. The data search server KSV is composed of a server computer or a personal computer.

The data search server KSV includes a control unit 21, a storage unit 22, and a communication interface unit 23. The communication interface unit 23 executes transmission of various data with the edge servers ESV1 to ESVn and the user terminals UT1 to UTm, according to communication protocols used in the edge network ENW and wide area network WNW. Note that the communication interface unit 23 is also used when data communication is executed with the cloud server CSV.

The storage unit 22 is composed as a storage medium by combining, for example, a nonvolatile memory capable of random write and read, such as an HDD (Hard Disk Drive)

or an SSD (Solid State Drive), a nonvolatile memory such as a ROM (Read Only Memory), and a volatile memory such as a RAM (Random Access Memory). A program storage area and a data storage area are provided in the storage area of the storage unit 22. The program storage area stores necessary programs for executing various control processes relating to one embodiment of the present invention.

An industry information table 221 and an industry relation information table 222 are provided in the data storage area.

The industry information table 221 classifies the edge server ESV1 to ESVn into a plurality of groups, and stores identification information (edge IDs) of edge servers ESV1 to ESVn belonging to each group by correlating the identification information (edge IDs) of the edge servers ESV1 to ESVn with identification information (ID) of the group.

For example, as illustrated in FIG. 4, the identification information (edge IDs) of the edge servers ESV1 to ESVn, which are managed by a company/body, is stored by being correlated with identification information (company/body ID) of the company/body, and an industry ID for identifying an industry, which is an upper-level organization of the company/body, is also stored. Note that when one edge server is shared by a plurality of companies/bodies, or one company/body belongs to a plurality of industries, the ID of the edge server that is the target is stored in a manner to overlap the IDs of the companies/bodies or industries to which the edge server belongs. In addition, the industry information table 221 may additionally store information or the like of the address or latitude/longitude representing the positions of installation of the edge servers ESV1 to ESVn, and other attribute information.

The industry relation information table 222 defines information representing the relation between industries. For example, as illustrated in FIG. 5, the industry relation information table 222 correlates and stores an industry ID of an individual industry and an ID of another industry having a high degree of relation with the individual industry.

The control unit 21 includes, for example, a hardware processor such as a CPU (Central Processing Unit), and includes, as control functions for realizing one embodiment of the present invention, an edge attribute information acquisition part 211, a table management part 212 and a search mediation control part 213. These control functional parts are realized by causing the hardware processor to execute the programs stored in the program storage area of the storage unit 22.

The edge attribute information acquisition part 211 acquires attribute information relating to edge servers from the edge servers ESV1 to ESVn. The edge attribute information includes an edge ID, an ID of a company/body to which the edge server belongs, and an ID of an industry to which the company/body belongs. Note that the attribute information may include other information such as information or the like of the positions of installation of the edge servers ESV1 to ESVn. In addition, the edge attribute information may be acquired from another server such as the cloud server CSV.

The table management part 212 executes a process of newly generating and updating the industry information table 221 and industry relation information table 222, based on the attribute information of edge servers acquired by the edge attribute information acquisition part 211.

The search mediation control part 213 includes the following processing functions.

(1) A function of executing a process of deciding, when receiving a data acquisition request from the user terminal, UT1 to UTm, whether an industry ID is included in the data acquisition request, and searching, when the industry ID is included, a correlated edge ID from the industry information table 221; and accessing a corresponding edge server, based on the searched edge ID, and collecting sensing data from the edge server.

(2) A function of executing a process of generating list information indicative of a relation between the industry ID included in the data acquisition request, and the company/body ID and edge ID searched from the industry information table 221; and generating report data edited by linking the acquired sensing data to the generated list information, and transmitting the report data to the user terminal, UT1 to UTm, which is the source of the data acquisition request.

(3) A function of executing a process of referring to the industry relation information table 222, based on the industry ID included in the data acquisition request, and deciding on the presence/absence of another industry having a high degree of relation with the industry of the industry ID; and, if the result of the decision indicates the presence of another industry having a high degree of relation, generating relation list information representative of the relation between an ID of the another industry, an ID of the company/body belonging to this industry, and an ID of the edge server operated by the company/body, and transmitting the relation list information to the user terminal, UT1 to UTm, which is the source of the data acquisition request.

(4) A function of executing a process of accessing, when an additional acquisition request designating the edge ID included in the transmitted relation list information is transmitted from the user terminal, UT1 to UTm, an edge server corresponding to the edge ID included in the additional acquisition request, acquiring sensing data, and transmitting the sensing data to the user terminal, UT1 to UTm, which is the source of the request.

(Operation)

Next, an operation by the data search server KSV with the above-described configuration will be described.

Figure 6:
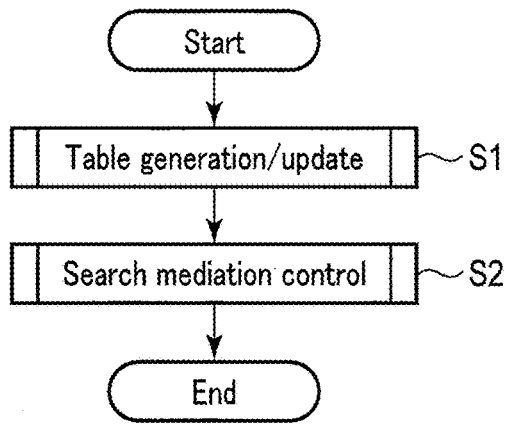
FIG. 6 is a flowchart illustrating a process procedure and process contents of a main routine which is executed in the data search apparatus illustrated in FIG. 3.

FIG. 6 is a flowchart illustrating an outline (main routine) of a process procedure of the data search server KSV.

To start with, in step S1, under the control of the control unit 21, the data search server KSV executes a process of generating or updating the industry information table 221 and industry relation information table 222. Then, in the next step S2, the data search server KSV executes search mediation control of data.

(1) Table Generation/Update Process

Figure 7:
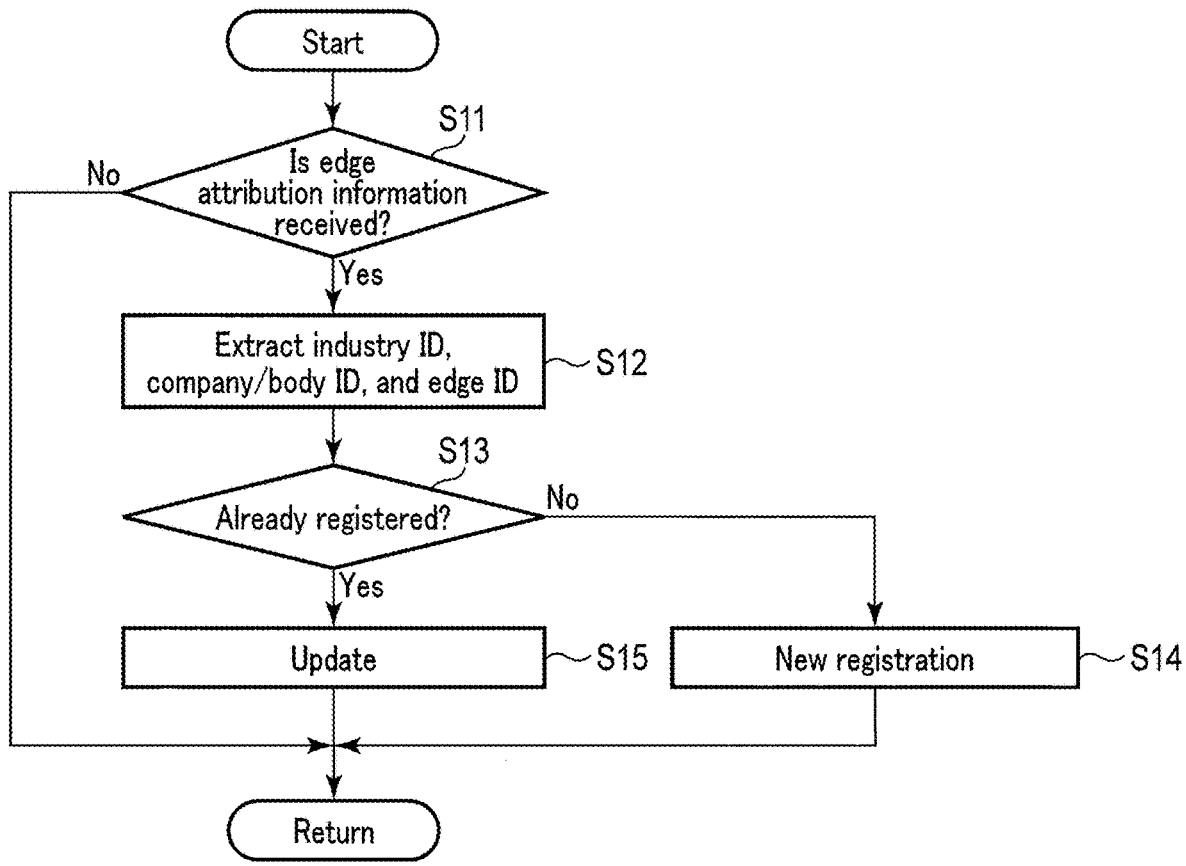
FIG. 7 is a flowchart illustrating a process procedure and process contents of a table generation/update control which is executed in the data search apparatus illustrated in FIG. 3.

FIG. 7 is a flowchart illustrating a process procedure and process contents of the table generation/update control process by the control unit 21.

(1-1) New Registration of Industry Information in Table

In step S11, under the control of the edge attribute information acquisition part 211, the control unit 21 of the data search server KSV first acquires edge attribute information from the edge servers ESV1 to ESVn before starting the operation of the apparatus. Then, in step S12, under the control of the table management part 212, the control unit 21 extracts, from the acquired edge attribute information, the edge ID, the ID of the company/body to which the edge server belongs, and the ID of the industry to which the company/body belongs, and decides whether the IDs are already registered in the industry information table 221. If the result of the decision indicates the non-registration, the control unit 21 newly registers the IDs acquired in step S14 in the industry information table 221.

The control unit 21 of the data search server KSV successively executes the above new registration process for all the edge servers ESV1 to ESVn, and generates the industry information table 221, for example, as illustrated in FIG. 4. Note that the industry relation information 222 is generated, for example, by a manual operation by an administrator. The above-described edge attribute information may be acquired from another server, for example, the cloud server CSV, which comprehensively manages the edge servers ESV1 to ESVn.

(1-2) Update of Table

In step S11, after the start of the operation of the system, the control unit 21 of the data search server KSV periodically acquires the edge attribute information from all the edge severs ESV1 to ESVn under the control of the edge attribute information acquisition unit 211. Then, in step S12, under the control of the table management part 212, the control unit 21 extracts, from the acquired edge attribute information, the edge ID, the ID of the company/body to which the edge server belongs, and the ID of the industry to which the company/body belongs, and decides whether the IDs are already registered in the industry information table 221. If the result of the decision indicates that the industry ID is registered but the edge ID is not registered, the control unit 21 additionally registers, in step S15, the acquired edge ID in the industry information table 221. In other words, the control unit 21 updates the industry information table 221.

(2) Data Search Mediation Control

Figure 8:
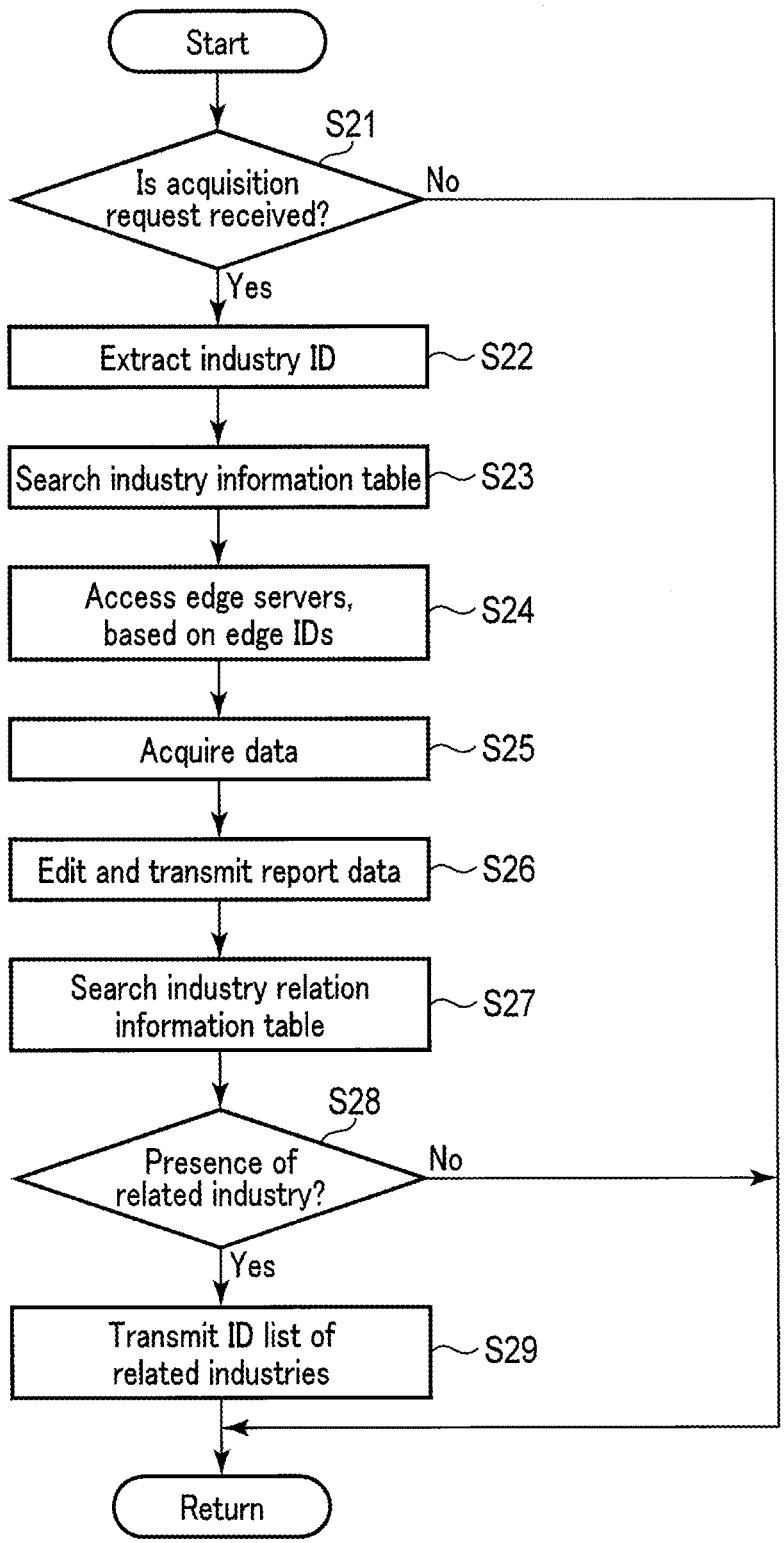
FIG. 8 is a flowchart illustrating an example of a process procedure and process contents of a search mediation control which is executed in the data search apparatus illustrated in FIG. 3.

FIG. 8 is a flowchart illustrating a process procedure and process contents of a search mediation control of sensing data by the control unit 21 of the data search server KSV.

(2-1) Batch Search of Edge Server Data Correlated with. Industry

When the user wishes to acquire batchwise the sensing data from all edge servers relating to a desired industry, the user inputs the industry ID of the desired industry to the user terminal UT1 on the menu screen provided from the data search server KSV. Then, a data acquisition request including the input industry ID is transmitted from the user terminal UT1 to the data search server KSV.

Upon deciding in step S21 the reception of the data acquisition request from the user terminal UT1 under the control of the search mediation control part 213, the control unit 21 of the data search server KSV first extracts the industry ID from the data acquisition request in step S22. Subsequently, the search mediation control part 213 of the control unit 21 searches, in step S23, the ID of the company/body and the edge IDs of the edge servers ESV, which are correlated with the extracted industry ID, from the industry information table 221.

Subsequently, in step S24, the search mediation control part 213 successively accesses, via the edge network ENW, the corresponding edge servers ESV, based on the searched edge IDs, and acquires sensing data from each edge server in step S25.

The search mediation control part 213 generates, in the next step S26, list information indicative of the relation between the industry ID included in the data acquisition request, the company/body ID and edge ID searched from the industry information table 221. Then, the search mediation control part 213 generates report data by linking the acquired sensing data to the generated list information, and transmits the report data from the communication interface unit 23 to the user terminal, UT1 to UTm, which is the source of the acquisition request.

For example, if it is assumed that the user designates the industry "A" as the data search target, "a1", "a2" and "a3" are searched as the IDs of the "company/body", and "Ea11", "Ea11", "Ea21", "Ea31" and "Ea32" are searched as the edge IDs, based on the industry information table 221 illustrated in FIG. 4. Then, sensing data is acquired from the corresponding edge servers, based on the edge IDs "Ea11", "Ea11", "Ea21", "Ea31" and "Ea32".

In conjunction with this, list information is generated which indicates, for example, in a tree, the relation between the industry ID "A", the searched company/body IDs "a1", "a2" and "a3" and edge IDs "Ea11", "Ea11", "Ea21", "Ea31" and "Ea32". In addition, report data is generated by linking each ID of the list information to the acquired corresponding sensing data, and the report data is transmitted to the user terminal of the source of the request.

(2-2) Provision of Related Industry List and Search of Edge Server Data Thereof

In addition, the search mediation control part 213, in step S27, refers to the industry relation information table 222, based on the industry ID included in the data acquisition request, and decides on the presence/absence of another industry with a high degree of relation with the industry in step S28. If the result of the decision indicates the presence of another industry having a high degree of relation, the search mediation control part 213 generates, in step S29, relation list information representative of the relation between the ID of the another industry, the ID of the company/body belonging to this industry, and the IDs of the edge servers operated by the company/body, and transmitting the relation list information to the user terminal, UT1 to UTm, which is the source of the data acquisition request.

For example, according to the industry relation information table 222 illustrated in FIG. 5, industries "C" and "D" are searched as other industries having high degrees of relation with the industry "A" designated by the user. In addition, based on the industry information table 221, relation list information is generated which represents the relation between the IDs "C" and "D" of the other industries, the IDs of the companies/bodies belonging to the industries, and the IDs of the edge servers operated by the companies/bodies, and the relation list information is transmitted to the user terminal of the source of the request.

The relation list information, which is transmitted from the data search server KSV, is displayed on the display unit of the user terminal. In this state, if the user executes a selection operation on a freely chosen edge ID in the relation list information, an additional acquisition request including this edge ID is transmitted from the user terminal to the data search server KSV.

Upon receiving the additional acquisition request, the data search server KSV accesses the corresponding edge server, based on the edge ID included in the additional acquisition request, and acquires sensing data from the edge server. Then, the acquired sensing data is transmitted to the user terminal, UT1 to UTm, of the source of the request.

Advantageous Effects

As has been described above in detail, in one embodiment, the industry information table 221 is provided which stores the edge IDs of edge servers ESV1 to ESVn operated and managed by the company/body, by correlating the edge IDs with the industry ID which identifies the industry, and the ID of the company/body belonging to the industry. In addition, when the data acquisition request designating the industry ID is received from the user terminal, UT1 to UTm, the edge servers correlated with the designated industry ID are searched from the industry information table 221, and sensing data is acquired from each of the searched servers and transmitted to the user terminal, UT1 to UTm, which is the source of the request.

Accordingly, by simply designating the ID of the industry with respect to which the user wishes to collect data, the user can acquire batchwise, without fail, the sensing data from all edge servers operated and managed by each company/body belonging to the industry. Thereby, the time and labor needed for data acquisition by the user can greatly be reduced.

In addition, when transmitting the sensing data, the data search server KSV generates the list information indicative of the relation between the industry ID, the company/body ID and each edge ID, and transmitting the sensing data by linking the edge ID of the list to the corresponding sensing data. Thus, the user can clearly recognize by which edge server the received sensing data is collected, and by which company/body the edge server is operated and managed.

In addition, the data search server KSV searches, from the industry relation information table 222, another industry having a high degree of relation with the industry designated by the user, generates the relation list information representative of the relation between the ID of the searched other industry, the ID of the company/body belonging to the industry, and the ID of the edge server operated and managed by the company/body, and transmits the relation list information to the user terminal of the source of the request. Moreover, when the additional acquisition request including the edge ID, which is included in the relation list information, is received from the user terminal, the sensing data of the edge server corresponding to the edge ID is acquired and transmitted to the user terminal of the source of the request.

Accordingly, the user can know, based on the relation list information, the presence/absence of another industry having a high degree of relation, and a company/body belonging to the another industry, and edge servers of the company/body. In addition, by designating a desired edge ID, based on the relation list information, and transmitting an additional acquisition request to the data search server KSV, the user can additionally acquire sensing data of the desired edge server.

Additionally, since the edge servers ESV1 to ESVn are connected via the local edge network ENW, and the data search server KSV is connected to the edge network ENW, the collection of sensing data from the edge servers ESV1 to ESVn by the data search server KSV can be performed without intervention of the wide area network WNW such as the Internet. As a result, the collection process of sensing data can be executed in a short time without undergoing the influence of traffic of the wide area network WNW or the influence of the transmission band of the access path. Besides, there is no concern of an increase in traffic of the wide area network WNW.

Additionally, by the data search server KSV, the edge attribute information is acquired from the edge servers ESV1 to ESVn, and the industry information table 221 is generated and updated based on the edge attribute information. Thus, the industry information table 221 can be automatically generated, and, when an edge server is added, changed or deleted during operation, the industry information table 221 can be automatically updated accordingly.

Other Embodiments

In the above-described one embodiment, the example was described in which the data search server KSV is provided independently from the edge servers ESV1 to ESVn and the cloud server CSV. However, aside from this, the function of the data search server may be provided in any one of the edge servers ESV1 to ESVn or in the cloud server CSV, or may be provided in the terminal or server which the user uses.

In the above-described one embodiment, the example was described in which the user designates the industry, and acquires batchwise the sensing data from the edge servers operated and managed by the company/body belonging to the industry. However, aside from this, the user may designate the company or body, and may acquire batchwise the sensing data from the edge servers operated and managed by the designated company or body.

Besides, the configuration of the data search apparatus, the process procedure and process content of the data search apparatus, the configuration of the industry information table, the configuration of the edge server, and the kinds and numbers of sensors and sensing data, may be various modified and implemented without departing from the spirit of the present invention.

In short, the present invention is not limited directly to the above-described embodiments. In practice, the structural elements can be modified and embodied without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined.

REFERENCE SIGNS LIST

SS11 to SSnk . . . Sensors
ESV1 to ESVn . . . Edge servers
CSV . . . Cloud server
UT1 to UTm . . . User terminals
WNW . . . Wide area network
ENW . . . Edge network
KSV . . . Data search server
PT . . . Operation management terminal
11 . . . Data storage unit
12 . . . Converters (CVs)
13 . . . Applications (APs)
14 . . . Control unit
15 . . . Monitoring unit
21 . . . Control unit of data search apparatus
22 . . . Storage unit
23 . . . Communication interface unit
111 . . . RAW data storage part
121 . . . Converter (CV)
131 to 133 . . . Search apps
141 . . . MANO management part
142 . . . MANO agent
211 . . . Edge attribute information acquisition part
212 . . . Table management part
213 . . . Search mediation control part
221 . . . Industry information table
222 . . . Industry relation information table

The invention claimed is:

1. A data search apparatus communicable via a network with a plurality of edge servers functioning as a data provision side and with a terminal functioning as a data acquisition side, the edge servers being configured to receive and accumulate data transmitted from a plurality of devices, the data search apparatus comprising:
a first storage table configured to correlate and store information which identifies the edge servers, and information which identifies an organization to which an owner of the devices which transmit the data to the edge servers belongs;
an edge server search part configured to search, when receiving a data acquisition request including the identification information of the organization from the terminal functioning as the data acquisition side, identification information of an edge server, which is correlated with the identification information of the organization included in the data acquisition request, from the first storage table;
a first data collection part configured to collect, based on the searched identification information of the edge server, the accumulated data from the corresponding edge server; and
a first data transmission part configured to transmit via the network the collected data to the terminal which is a transmission source of the data acquisition request.

2. The data search apparatus of claim 1, further comprising:
an edge attribute information acquisition part configured to acquire edge attribute information including the identification information of the edge server and the identification information of the organization to which the owner of the devices which transmit the data to the edge servers belongs; and
a storage table management part configured to generate or update the first storage table, based on each identification information included in the acquired edge attribute information.

3. The data search apparatus of claim 1, further comprising:
a second storage table configured to represent a relation between the organizations;
a related organization search part configured to search, based on the identification information of the organization included in the data acquisition request received from the terminal functioning as the data acquisition side, another organization having a relation with the organization from the second storage table; and
a list transmission part configured to search, from the first storage table, identification information of an edge server correlated with the searched another organization, and to transmit, via the network, list information representative of a list of the edge server to the terminal which is the transmission source of the data acquisition request.

4. The data search apparatus of claim 3, further comprising:
a second data collection part configured to collect, when receiving from the terminal a data additional acquisition request including identification information of an edge server included in the list information, the accumulated data from the corresponding edge server, based on the identification information of the edge server included in the data additional acquisition request; and
a second data transmission part configured to transmit via the network the collected data to the terminal which is a transmission source of the data additional acquisition request.

5. The data search apparatus of claim 1, wherein
when a local edge network, which interconnects the edge servers, is provided separately from the network,
the first or second data collection part collects the accumulated data from the edge servers via the edge network.

6. An edge server which is a specific edge server of a plurality of edge servers capable of receiving and accumulating data transmitted from a plurality of devices and capable of executing data transmission among the edge servers, the edge server comprising:
a storage table configured to correlate and store information which identifies the edge servers, and information which identifies an organization to which an owner of the devices which transmit the data to the edge servers belongs;
a request reception part configured to receive via a network a data acquisition request including the identification information of the organization, the data acquisition request being transmitted from a terminal functioning as a data acquisition side;
an edge server search part configured to search, from the storage table, identification information of an edge server which is correlated with the identification information of the organization included in the received data acquisition request;
a data collection part configured to collect, based on the searched identification information of the edge server, the accumulated data from the corresponding edge server; and
a data transmission part configured to transmit via the network the collected data to the terminal which is a transmission source of the data acquisition request.

7. A non-transitory computer readable medium storing a program causing a computer to execute a data search method, the computer being included in a data search apparatus communicable via a network with a plurality of edge servers functioning as a data provision side and with a terminal functioning as a data provision side and with a terminal functioning as a data acquisition side, the edge servers being configured to receive and accumulate data transmitted from a plurality of devices, the data search method comprising:
correlating, and storing in a first storage table, information which identifies the edge servers, and information which identifies an organization to which an owner of the devices which transmit the data to the edge servers belongs;
searching, when receiving a data acquisition request including the identification information of the organization from the terminal functioning as the data acquisition side, identification information of an edge server, which is correlated with the identification information of the organization included in the data acquisition request, from the first storage table;
collecting, based on the searched identification information of the edge server, the accumulated data from the corresponding edge server; and
transmitting via the network the collected data to the terminal which is a transmission source of the data acquisition request.

* * * * *